United States Patent
Ebbrell et al.

(10) Patent No.: US 6,867,159 B2
(45) Date of Patent: Mar. 15, 2005

(54) APPLICATION OF AN IONOMER LAYER TO A SUBSTRATE AND PRODUCTS RELATED THERETO

(75) Inventors: Guy Ebbrell, Montreal (CA); John Gaffney, North Chelmsford, MA (US)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 10/728,720

(22) Filed: Dec. 4, 2003

(65) Prior Publication Data

US 2004/0175506 A1 Sep. 9, 2004

Related U.S. Application Data

(60) Provisional application No. 60/431,449, filed on Dec. 4, 2002.

(51) Int. Cl.$^7$ ............................ C04B 35/52; B05D 5/12; B05D 5/00; B05D 3/12; B05D 3/02
(52) U.S. Cl. ........................ 502/101; 427/115; 427/243; 427/244; 427/356; 427/372.2
(58) Field of Search .......................... 502/101; 427/115, 427/243, 244, 356, 119, 372.2, 430.1; 29/623.5; 429/30, 32, 33, 41

(56) References Cited

U.S. PATENT DOCUMENTS

| | | | | |
|---|---|---|---|---|
| 3,989,870 A | * | 11/1976 | Bocks et al. ................. | 442/221 |
| 4,417,959 A | * | 11/1983 | Kadija et al. ................ | 205/525 |
| 4,919,037 A | | 4/1990 | Mitchell ...................... | 89/36.05 |
| 5,716,680 A | * | 2/1998 | Martin et al. ................ | 423/601 |
| 6,103,822 A | | 8/2000 | Housel et al. ............... | 524/840 |
| 6,239,377 B1 | | 5/2001 | Nishikawa ............... | 174/110 R |
| 6,303,665 B1 | | 10/2001 | Helber et al. ................. | 521/65 |
| 2002/0058178 A1 | * | 5/2002 | Narayanan et al. ........... | 429/42 |
| 2003/0134178 A1 | * | 7/2003 | Larson ......................... | 429/44 |

* cited by examiner

*Primary Examiner*—Mark L. Bell
*Assistant Examiner*—Patricia L. Hailey
(74) *Attorney, Agent, or Firm*—Seed IP Law Group PLLC

(57) ABSTRACT

A disclosed method for coating a substrate with an ionomer, applies the ionomer as a component of a stable foam, then dries the applied foam layer. The substrate to be so coated, in particular embodiments, is an electrode substrate, with or without a catalyst layer applied thereon. In another embodiment, the substrate is an ion-exchange membrane. In yet more particular embodiments, the substrate is suitable for use in an electrochemical fuel cell. Also disclosed are products made by the disclosed methods, namely, ionomer-coated substrates, including ionomer-coated electrode substrates and electrodes. The foam layer may also comprise catalyst powder to form a catalyst layer. Membrane electrode assemblies, fuel cells, and fuel cell stacks that incorporate the substrates are also disclosed, as are motor vehicles, and stationary and portable electrical power-generating plants that incorporate the fuel cell stacks.

28 Claims, No Drawings

APPLICATION OF AN IONOMER LAYER TO A SUBSTRATE AND PRODUCTS RELATED THERETO

CROSS-REFERENCE TO RELATED APPLICATION

This application claims the benefit of U.S. Provisional Patent Application No. 60/431,449 filed Dec. 4, 2002, where this provisional application is incorporated herein by reference in its entirety.

BACKGROUND OF THE INVENTION

1. Field of the Invention

The present invention generally relates to application of an ionomer layer to a substrate, and more particularly to application of an ionomer layer to an electrode substrate or electrode suitable for use in an electrochemical fuel cell.

2. Description of the Related Art

Electrochemical fuel cells ("fuel cells") have the capability of generating electricity from a fuel and an oxidant in a clean and efficient manner, and have been the focus of considerable attention. When hydrogen is used as the fuel, hydrogen is combined in the fuel cell with oxygen (in the air) to produce electricity, with heat and water being the only by-products. There are a number of types of fuel cells, distinguished largely by the type of electrolyte employed. One type of fuel cell utilizes a polymer electrolyte membrane ("PEM"), and is referred to as a PEM fuel cell. A PEM is an ion-exchange membrane comprising a solid, organic polymer that can conduct ionic species. The PEM that is useful for fuel cells is a proton exchange membrane that conducts protons and other cations, but not anions or electrons. A typical commercial PEM is a sulfonated perfluorocarbon membrane sold by E. I. Du Pont de Nemours and Company under the trade designation Nafion®. The key component of a PEM fuel cell is the membrane electrode assembly ("MEA"), which is a consolidated assembly of an anode and a cathode (both typically planar), and a PEM sandwiched therebetween.

Each electrode (i.e., anode and cathode) comprises a substrate that is porous and electrically conductive. Such substrates are often prepared using woven or non-woven carbon paper or fabric that has been treated to impart a desired level of porosity and electrical conductivity. One side of each substrate is coated with a thin layer of catalyst, typically platinum. This catalyst layer is applied as a slurry of very small catalyst particles and ionomer particles suspended in a volatile solvent. Prior to application of the catalyst layer, a carbon sublayer is often applied to the substrate and dried in order to provide a suitable surface for application of the catalyst layer.

Following application of the catalyst slurry to the substrate, heat is applied to drive off the solvent. The ionomer particles bind the catalyst particles to form the catalyst layer, and further bind the catalyst layer to the substrate. If dried too quickly, the catalyst layer is prone to cracking and adhering poorly to the substrate. One approach used to counter this tendency is to dry in a staged fashion. In this manner, the substrate having the catalyst slurry applied thereto is exposed to more than one drying zone. The plurality of drying zones are characterized by different temperatures and airflows, where temperature and airflow can be incrementally varied from the initial to the final drying zone. Airflows used for drying can be adjusted and configured in various ways to increase drying rates in a staged fashion. As an example, roll support of the substrate web may be used in initial drying zones, while air flotation of the web is used in the final drying zones. A similar drying technique may be used for drying the carbon sublayer prior to application of the catalyst slurry.

In order to provide sufficient power output, MEAs are typically stacked to provide a "fuel cell stack". Interposed between such stacked MEAs are separator or fluid flow field plates having channels. Hydrogen is directed to the electrochemically active area of the anode through these channels in the fluid flow field plate, while oxygen (e.g., in the air) is directed to the electrochemically active area of the cathode through different channels. The gaseous hydrogen diffuses through the porous anode substrate and contacts the catalyst layer, where it dissociates into protons and electrons. The PEM allows passage of the protons from the anode to the cathode, but not electrons. Instead, the electrons are conducted through the electrode substrate and separator plate (also called a current collector), and then through an external circuit to the cathode. Oxygen diffusing through the porous cathode substrate reacts at the catalyst layer with the protons and electrons to yield water and heat. In view of the diffusion that occurs through the anode and cathode substrates, the anode and cathode are also referred to as gas diffusion electrodes ("GDEs") and their substrates as gas diffusion layers ("GDLs").

The efficiency of this process and, thus, the power density (i.e., electrical power/volume of fuel cell) that is possible for a fuel cell is a function of, among other things, access to the PEM by the protons formed at the catalyst of the anode, as well as access of the protons passing through the PEM to the catalyst of the cathode. Thus, the physical structure of the MEA should provide minimal resistance to the movement of protons from the catalyst of the anode, through the PEM, and to the catalyst of the cathode.

For this reason, the anode and cathode are typically treated prior to assembly of the MEA. For example, when the PEM is made from Nafion®, and one major planar surface of each of the anode and cathode comprises a thin layer of platinum catalyst particles bound by Nafion®, an additional layer of Nafion® ionomer is often applied to the surface of each catalyst layer prior to assembly of the MEA. When the MEA is then formed by interposing the PEM between the two electrodes, followed by application of heat and pressure, a continuum of Nafion® ionomer is formed between the anode and cathode catalyst surfaces. This continuum is achieved by the ionomer of the PEM and in the catalyst layers, as well as the additional ionomer coating applied to the catalyst layers, melting together when heat is applied and then solidifying upon cooling.

There are, however, disadvantages associated with existing methods for application of this additional layer of ionomer over the thin catalyst layers on the electrode substrate. For example, one method for applying the additional layer of ionomer involves spraying a dispersion of ionomer particles onto the catalyst layer. Spraying results in considerable material waste due to poor transfer efficiency. Also, spraying can yield non-uniformities in the applied layer that can result in resistance to movement of protons. This is particularly problematic when the amount of material to be applied is very small. At workable processing speeds, spraying small amounts of material necessitates the use of low spray pressures, which often results in poor atomization and non-uniform spray patterns. This problem may be ameliorated by using intermittent spraying, and by adjusting the on and off times of a plurality of spray nozzles. However, this method also suffers from non-uniformity when only small amounts of material are applied to the surface, as well as variability associated with nozzle blockages and/or varying air pressure.

Another method of applying the additional layer of ionomer employs slot die coating a solution of ionomer. However, slot die coating typically yields a layer that is too thick, and that has excessive penetration of the ionomer into the substrate. Gravure coating and similar roll coating methods have also been used for this purpose. However, these methods involve direct contact between a gravure roll (or other roll) and the substrate surface having the layer of catalyst. This causes a number of problems. For example, the catalyst layer is quite fragile and its adhesion to the substrate is limited. Consequently, poorly adherent portions of the catalyst layer may be transferred to the roll coater, thus damaging the substrate surface and causing the loss of catalyst, as well as contaminating the roll which necessitates frequent cleaning.

Accordingly, there remains a need in the art for improved methods for adding an ionomer layer to the surface of a substrate, particular to the surface of an electrode substrate having a thin, fragile catalyst layer onto which the ionomer layer is to be applied. There is also a need in the art for products incorporating such substrates.

BRIEF SUMMARY OF THE INVENTION

The present invention is generally directed to the application of an ionomer layer to a substrate, particularly to an electrode substrate or electrode for use in a fuel cell. The ionomer layer is applied to the substrate in the form of a stable ionomer-containing foam which is prepared by mixing a foamable ionomer-containing fluid with a gas to form a mixture, and then agitating the same.

Accordingly, in one embodiment, a method is disclosed for coating a substrate with an ionomer comprising the steps of applying a layer of a stable foam to at least one surface portion of the substrate, and then drying the layer of stable foam. The stable foam, in turn, is prepared by mixing a foamable ionomer-containing fluid with a gas to form a mixture and agitating the mixture to yield the stable foam. Such steps may be done in either a continuous or batch process.

In a more specific embodiment, the substrate is a sheet of porous, electrically conductive material, such as woven or non-woven carbon fiber paper, suitable for use as an electrode substrate. Such an electrode substrate may further comprise a catalyst layer to yield an electrode, in which case, the layer of stable foam is applied over the catalyst layer. Suitable ionomers include Nafion®, while suitable catalysts include platinum, in particular, where the electrode substrates and electrodes are used in fuel cells.

In another embodiment, the substrate is an ion-exchange membrane. In such an embodiment, the ionomer in the ionomer containing layer may either be the same as or different than the ionomer in the ion-exchange membrane.

In yet another embodiment, the ionomer containing layer may further comprise a catalyst powder, such as, for example, platinum on a carbon support. In such an embodiment, the ionomer containing layer may also be the catalyst layer in a fuel cell.

Products made according to the methods of this invention are also disclosed, including ionomer-coated substrates, and more particularly, ionomer-coated electrode substrates and electrodes. Additionally, disclosed are MEAs, fuel cells and fuel cell stacks that incorporate the electrode substrates made according to the methods of this invention, as well as motor vehicles, and stationary and portable electrical power-generating plants that incorporate the fuel cell stacks.

These and other aspects of the present invention will be evident upon reference to the following detailed description. To this end, a number of articles and patent documents are cited herein to aid in understanding certain aspects of this invention. Such documents are hereby incorporated herein by reference in their entirety.

DETAILED DESCRIPTION OF THE INVENTION

As mentioned above, the present invention is directed to novel methods for preparing ionomer-coated substrates, in particular, where the substrates are sheets of porous, electrically conductive material, suitable for use as electrode substrates in, for example, fuel cells. This invention is also directed to ionomer-coated substrates, including ionomer-coated electrode substrates and electrodes for fuel cells, made by the above methods. MEAs, fuel cells and fuel cell stacks that incorporate the disclosed ionomer-coated electrode substrates are also disclosed. In addition, disclosed are motor vehicles, as well as stationary and portable electrical power-generating plants that incorporate the disclosed fuel cell stacks.

In one embodiment, disclosed is a method for coating a substrate with an ionomer by adherently applying to a surface portion thereof a layer of a stable foam containing the ionomer, then drying the same. As used herein, the expression "stable foam" refers to a foam that does not break down into a liquid before, during or after application to the substrate, or before the foam layer is dried. Generally, the stable foam is be prepared by: 1) dissolving an ionomer, or dispersing ionomer particles, in a suitable solvent (aqueous or organic), as would be readily appreciated by one skilled in the art, 2) optionally adding, as needed, a suitable foaming agent to yield a foamable fluid, and 3) mechanically agitating a mixture of the foamable fluid and a gas to yield a stable foam, the relative amounts of foamable fluid and gas being metered to yield a foam having desired properties, such as viscosity. For the embodiments disclosed herein, the ionomer-containing, stable foam is typically prepared by mixing a suitable gas and a foamable fluid, containing the ionomer. The mixture of gas and foamable fluid is mechanically agitated to form the stable foam.

The ionomer-containing, stable foam is applied as a layer to at least one surface portion of the substrate, using a foam application means. Such means are known to those skilled in the art. Finally, the substrate, having the layer of stable foam applied thereto, is dried to yield a substrate coated with a dried ionomer-containing layer of material ("ionomer layer"). Various drying techniques may be used, as would be appreciated by one skilled in the art, including drying techniques previously described herein for catalyst layers applied to electrode substrates.

Methods for preparing foams, generally, and for applying them as coatings, are known. For example, U.S. Pat. No. 4,263,344 (hereinafter, "the '344 patent") discloses coating sheet material, such as art paper or pressure-sensitive copying paper, with a foam prepared from a composition comprising clay or phenolic resin particles suspended in an aqueous medium having a foaming agent added thereto. Also disclosed is subsequent drying of the applied foam layer. The '344 patent describes the method disclosed therein as a way to lower the viscosity of a high solids content material so as to impart thereto a fluidity, satisfactory for coating. Further described therein is the addition of foaming agents, such as a surface active agent or polyvinyl alcohol, to the coating composition prior to foaming the same. The composition is then foamed by mixing with air and stirring the mixture in a mixing tank. The '344 patent also discusses controlling the viscosity of foam by controlling the ratio of the composition to be foamed and the air mixed therewith.

Generally, the ratio of gas to foamable fluid in the mixture thereof that is rendered into foam, is expressed on a volume basis and is called the "blow ratio." In various embodiments, the gas is an inert gas, such as nitrogen, oxygen or air. When air is used as the gas, it has been found that a suitable blow ratio of the air to foamable fluid is in the range of 2:1 to 20:1, and more particularly 10:1. The blow ratio may be determined by first measuring the volume of initial fluid, foaming all of the fluid and then measuring the resulting volume of foam.

As another example of a known method for preparing foam and applying the same as a coating, U.S. Pat. No. 4,571,360 (hereinafter, "the '360 patent") discloses coating paper with foam comprising a paper treating agent that may include a sizing agent, binding agent, coloring agent, oil or water repellant, and filler. Disclosed therein is a foamable composition comprising the paper treating agent, a liquid vehicle (water or organic solvents), and a foaming agent. However, in contrast to the present invention, the foam used for the method of the '360 patent is fast breaking with limited stability. In other words, the foam reverts substantially immediately to a liquid upon contact with the substrate. The foaming agent of the '360 patent is selected, accordingly, from certain fatty acids and fatty phosphate esters, among others. Further, the '360 patent describes the application of paper treating agents as a foam as advantageous over spray application, from the standpoint of applying more uniform coatings, avoiding the plugging of spray nozzles from high solids content fluids, and being able to apply high viscosity compositions.

Additionally, the '360 patent notes that foam generation means are known to those skilled in the art and, more particularly, that static, radial and axial type commercially available foaming apparatus are well known. The '360 patent further notes that foam generation means generally consist of a mechanical agitator capable of mixing metered quantities of gas and liquid treating composition. The effect of varying operating parameters of such foam generation means on the characteristics of the foam obtained is also discussed (see, e.g., the '360 patent at col. 6, line 62 to col. 7, line 6). The '360 patent also describes foam application means as generally being a nozzle or similar apparatus and cites U.S. Pat. No. 4,023,526 as providing a description of a nozzle apparatus, preferred for their application (see, e.g., the '360 patent at col. 7, lines 7–28).

For certain embodiments of the present invention, the ionomer-containing, stable foam is prepared by mixing an ionomer-containing, foamable fluid with a suitable gas, as noted above, and mechanically agitating the mixture, also as noted above. In one embodiment, an apparatus for such mechanical agitation is used that is capable of high shear agitation and independent metering of gas and foamable fluid. Such an apparatus is available from Gaston Systems Inc. of North Carolina, USA.

Additionally, embodiments of the present invention, in another aspect, are directed to methods for applying stable, ionomer-containing foam to the substrates described herein and to be coated therewith, using application means well known in the art, as noted above. Virtually any wet technique may be used such as, for example, blade coating, die coating, comma bar coating, screen printing or dip coating. The foam may also be applied in either a continuous or batch process.

One aspect of the present invention is providing a method for making improved ionomer-coated electrode substrates and electrodes; improved MEAs, fuel cells and fuel cell stacks that incorporate the same; as well as motor vehicles, and stationary and portable electrical power-generating plants that incorporate the improved fuel cell stacks. Accordingly, in a certain embodiment, the substrate coated with ionomer is a sheet of porous, electrically conductive material, and the ionomer-containing, stable foam is applied to a major planar surface thereof as a substantially continuous layer. In a related embodiment, the sheet of porous, electrically conductive material further comprises a thin layer of catalyst adhering to one of its major planar surfaces, the ionomer-containing, stable foam being applied over the catalyst layer to yield an ionomer-coated substrate that may be used as an electrode for electrochemical fuel cells. In more particular related embodiments directed to methods of the present invention, the sheets of porous, electrically conductive material to be coated with ionomer comprise woven or non-woven fiber paper, the catalyst is finely divided platinum, the ionomer is Nafion®, and the foamable fluid is a dispersion of Nafion® particles or a solution of Nafion® in a mixture of water and alcohol. The alcohol, in one specific embodiment, is isopropyl alcohol. An aqueous dispersion or solution of Nafion® readily foams. Therefore, addition of a foaming agent is generally not necessary for that embodiment.

Alcohol, in particular, isopropyl alcohol is added to allow the ionomer-containing foam to wet a catalyst layer where the substrate to be coated comprises the same. An optimal mixture of Nafion® ionomer, water and isopropyl alcohol is such that the fluid mixture readily yields a stable foam, yet also wets the catalyst layer. In particular, an aqueous dispersion of Nafion® ionomer may have adequate foaming properties in the absence of alcohol. Accordingly, in a yet more specific related embodiment, the concentration of isopropyl alcohol is 0–30% by weight of the foamable fluid. The concentration of Nafion® in the foamable fluid is typically 1–20% by weight, more particularly 7–10% by weight.

The above methods are well suited for preparing ionomer-coated GDLs (no catalyst layer) and GDEs (include catalyst layer), used in electrochemical fuel cells. Such ionomer-coated substrates can be bonded to a PEM to form a MEA, from which a fuel cell can then be made. Methods for preparing GDLs and GDEs (to be coated with ionomer and then incorporated into a fuel cell) using, for example, woven or non-woven carbon fiber paper, are known. Such methods are described, for example, in U.S. Pat. Nos. 5,998,057 and 6,183,898 B1. More particularly, described therein is impregnating woven and non-woven papers and fabrics, having high open porosity, with an electrically conductive material. The latter may be prepared as a suspension of, for example, carbon black powder or suitable metal.

Typically, GDLs and GDEs are also treated so as to be rendered substantially hydrophobic. To add hydrophobicity thereto, various binders may be added, for example, perfluoronated polymers. Impregnation steps are generally followed by drying and sintering steps (see, e.g., U.S. Pat. No. 6,183,898 B1 at col. 2, line 36 to col. 3, line 57).

Methods for applying thin layers of catalyst to GDLs to yield GDEs are also known (see, e.g., U.S. Pat. No. 6,183, 898 B1 at col. 4, line 28 to col. 5, line 67). Not all embodiments of the present invention, directed to methods for applying an ionomer coating to a substrate, the latter to be subsequently bonded to a PEM to make a MEA, comprise application of an ionomer-containing stable foam layer to an electrode surface comprising a thin catalyst layer. Instead, in some embodiments, the foam layer is applied to a surface of an electrode substrate (i.e., no catalyst layer), where the ionomer-coated electrode substrate is then bonded to a catalyst-coated PEM.

In another embodiment, the substrate coated with ionomer is an ion-exchange membrane. The ionomer in the ionomer layer may be the same ionomer as that in the membrane. Alternatively, the ionomer may differ. However, generally improved fuel cell performance may be observed if the ionomer is the same.

In another embodiment, the ionomer containing fluid also has a catalyst powder dispersed therein. In such an embodiment, the ionomer layer may also function as the catalyst layer in the fuel cell and may be applied to either the porous electrode or the ion-exchange membrane. In certain embodiments, there are at least two coating steps on the same substrate, one in which the ionomer-containing fluid further comprises a catalyst powder, and a second in which the ionomer containing layer is substantially free of catalyst. Alternatively, a foam layer without catalyst may be applied to a surface of an electrode substrate, and a second foam layer containing catalyst powder may be applied to a surface of an ion-exchange membrane.

Applying ionomer as a component of a foam, according to the present invention, rather than as a component of a liquid, has a number of advantages. For example, a more uniform application to a substrate may be possible, as compared to, for example, spray application of a liquid. This may be particularly useful where an electrode substrate or electrode are coated with ionomer for bonding to a PEM to make a MEA. More uniform ionomer coatings for such bonding should yield MEAs characterized by less resistance to the conduction of protons from anode catalyst surfaces, through the PEM, to cathode catalyst surfaces.

Further, when a layer of ionomer is coated over a thin, fragile catalyst layer, foam coating may avoid direct contact of a rigid applicator surface, such as the surface of a roll coater, with the rough surface of the catalyst layer. This, in turn, may result in less damage to the catalyst layer surface or less penetration by the ionomer into the substrate.

Where the coated substrate is an electrode substrate or electrode for a fuel cell, the thick foam layer can then be compressed to a desired thickness when the coated substrate and PEM are bonded together to form a MEA. This may allow for a final coating thickness thinner than that readily obtainable using many other coating techniques. Where the coated substrate is an ion-exchange membrane, less swelling of the membrane may be observed than if a liquid layer had been applied directly on the membrane.

Accordingly, in one embodiment of the method of the present invention, ionomer-containing, stable foam is applied to at least one surface portion of a substrate as a layer having a thickness ranging from about 25 $\mu$m to about 2 mm. In another embodiment, the thickness is about 250 $\mu$m. In yet another specific embodiment, ionomer-containing stable foam is applied to at least one surface portion of a substrate so as to yield an ionomer layer thereon having a weight ranging from about 0.5 to about 25 grams per square meter of the surface portion. In a related specific embodiment, the weight is about 2 grams per square meter of the surface portion.

In another aspect, the present invention is directed to an ionomer-coated substrate, electrode substrate, and electrode, made according to the above disclosed methods. In yet another aspect, disclosed is a MEA comprising the disclosed electrode substrate. Incorporating the electrode substrates of the present invention into a MEA is done by methods well known in the art for bonding electrodes or electrode substrates to PEMs to form MEAs (see, e.g., U.S. Pat. No. 5,176,966 at col. 8, lines 38–47).

As one example of making the disclosed MEA, two GDEs (one providing the anode, and the other providing the cathode) are provided, where each GDE has a catalyst layer applied to one major planar surface thereof and an ionomer layer coating the catalyst layer, the layer applied using the methods of the present invention. A PEM is interposed between the two GDEs so that the GDEs and PEM are assembled coextensively with the ionomer layer of each GDE in contact with the PEM. Then, heat and pressure is applied to the assembly so as to permanently bond the GDEs and PEM together to form the MEA having a desired overall thickness. In the process, the ionomer layer is compressed, that is, its thickness is reduced. Optionally, the MEA is then cut to a desired size and shape. Also, optionally, the edges of the MEA are then impregnated with a sealant material.

As another example of making the disclosed MEA, two GDLs (one providing the anode substrate and the other providing the cathode substrate) are provided where neither GDL comprises a catalyst layer and each GDL has one major planar surface coated with an ionomer layer, the layer applied using the methods of the present invention. As in the previous example, a PEM is interposed between the two GDLs so that the GDLs and PEM are assembled coextensively with the ionomer layer of each GDL in contact with the PEM. In this example, however, the catalyst layers for the anode and cathode are first adherently applied to the PEM. Methods for preparing surfaces to be in contact with a catalyst layer are known in the art (see, e.g., U.S. Pat. No. 5,998,057).

Also, as in the previous example, heat and pressure is applied to the assembly so as to permanently bond the GDLs and PEM together to form the MEA having a desired overall thickness. The temperature and pressure, needed to form an MEA having a desired overall thickness and using the ionomer-coated electrodes or electrode substrates of the present invention, are readily determined by one of skill in the art. The MEA is optionally cut and sealed as before.

The present invention, in other embodiments, is directed to fuel cells and fuel cell stacks that incorporate the ionomer-coated substrates made by the disclosed methods. Typically, such fuel cells and fuel cell stacks would be made using the disclosed MEA by methods well known in the art. Finally, the present invention, in yet additional embodiments, is directed to motor vehicles, as well as stationary and portable electrical power-generating plants, that incorporate the disclosed fuel cell stacks. Such incorporation is accomplished by methods that are also well known in the art.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for coating a substrate with an ionomer comprising the steps of:

applying a layer of a stable foam to at least one surface portion of the substrate; the stable foam having been prepared by mixing a foamable ionomer-containing fluid with a gas to form a mixture and agitating the mixture to yield the stable foam; and drying the layer of stable foam, thereby yielding an ionomer-coated substrate.

2. The method of claim 1 wherein the layer of stable foam is applied to the at least one surface portion of the substrate in a continuous manner.

3. The method of claim 1 wherein the layer of stable foam is applied to the at least one surface portion of the substrate at a uniform thickness.

4. The method of claim 1 wherein the layer of stable foam is applied to the at least one surface portion of the substrate at a thickness ranging from 25 μm to 2 mm.

5. The method of claim 4 wherein the layer of stable foam is applied to the at least one surface portion of the substrate at a thickness of about 250 μm.

6. The method of claim 1 wherein the layer of stable foam is applied to the at least one surface portion of the substrate in an amount ranging from 0.5 to 25 grams of ionomer per square meter.

7. The method of claim 1 wherein the layer of stable foam is applied to the at least one surface portion of the substrate in such an amount as to yield a dried ionomer layer weighing about 2 grams per square meter of the surface portion.

8. The method of claim 1 wherein the at least one surface portion is one major planar surface of a sheet of porous, electrically conductive material.

9. The method of claim 8 wherein the one major planar surface of the sheet of porous, electrically conductive material further comprises a catalyst layer thereon.

10. The method of claim 8 wherein the ionomer-containing fluid further comprises a catalyst powder.

11. The method of claim 8 wherein the sheet of porous, electrically conductive material is a sheet of woven or non-woven carbon fiber paper.

12. The method of claim 1 wherein the at least one surface portion is one major planar surface of an ion-exchange membrane.

13. The method of claim 12 wherein the ionomer-containing fluid further comprises a catalyst powder.

14. The method of claim 1 wherein the ionomer of the ionomer-containing fluid is sulfonated perfluorocarbon ionomer.

15. The method of claim 1 wherein the ionomer-containing fluid further comprises water and an alcohol.

16. The method of claim 15 wherein the alcohol is isopropyl alcohol.

17. The method of claim 16 wherein the concentration of isopropyl alcohol ranges from 0% to 30% by weight of the ionomer-containing fluid.

18. The method of claim 15 wherein the concentration of ionomer ranges from 1% to 20% by weight of the fluid.

19. The method of claim 15 wherein the concentration of ionomer ranges from 7% to 10% by weight of the fluid.

20. The method of claim 1 wherein the gas is substantially chemically inert.

21. The method of claim 1 wherein the gas is nitrogen.

22. The method of claim 1 wherein the gas is oxygen or air.

23. The method of claim 22 wherein the ratio of air to ionomer-containing fluid is between 2:1 and 20:1.

24. The method of claim 1 wherein agitation of the mixture of the ionomer-containing fluid and the gas is performed with a mechanical agitator.

25. The method of claim 24 wherein the mechanical agitator achieves high shear agitation.

26. The method of claim 1 wherein the layer of the stable foam is applied to the at least one surface portion of the substrate by blade coating, die coating, comma bar coating, screen printing or dip coating.

27. The method of claim 1 wherein the steps of applying and drying are performed in a continuous manner.

28. The method of claim 1 wherein the steps of applying and drying are performed as a batch process.

* * * * *